United States Patent
Higa et al.

(10) Patent No.: US 9,037,377 B2
(45) Date of Patent: May 19, 2015

(54) VEHICLE

(75) Inventors: Mitsuaki Higa, Toyota (JP); Katsuhiko Yamaguchi, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 16 days.

(21) Appl. No.: 13/363,037

(22) Filed: Jan. 31, 2012

(65) Prior Publication Data

US 2012/0203433 A1 Aug. 9, 2012

(30) Foreign Application Priority Data

Feb. 4, 2011 (JP) ................................. 2011-023101

(51) Int. Cl.
*B60T 7/12* (2006.01)
*B60T 7/04* (2006.01)
*B60T 13/74* (2006.01)

(52) U.S. Cl.
CPC ................. *B60T 7/122* (2013.01); *B60T 7/042* (2013.01); *B60T 13/745* (2013.01)

(58) Field of Classification Search
CPC ....... B60T 7/122; B60T 2201/06; B60T 7/12; B60T 2201/04
See application file for complete search history.

(56) References Cited

U.S. PATENT DOCUMENTS

| | | | |
|---|---|---|---|
| 4,717,207 A * | 1/1988 | Kubota et al. ..................... 303/3 |
| 4,849,890 A * | 7/1989 | Inoue et al. ..................... 701/80 |
| 5,132,906 A * | 7/1992 | Sol et al. .......................... 701/80 |
| 5,911,646 A * | 6/1999 | Tsutsui et al. .................... 477/93 |
| 6,260,934 B1 * | 7/2001 | Lee .................................. 303/192 |
| 7,979,190 B2 * | 7/2011 | Ohmori et al. .................. 701/70 |
| 2003/0119628 A1 * | 6/2003 | Jager et al. ..................... 477/71 |
| 2009/0192019 A1 * | 7/2009 | Groner et al. ................ 477/195 |
| 2009/0298642 A1 * | 12/2009 | Choi ................................ 477/4 |

FOREIGN PATENT DOCUMENTS

| | | | |
|---|---|---|---|
| JP | 2-060864 A | | 3/1990 |
| JP | 08113122 A | * | 5/1996 |
| JP | 08-282456 A | | 10/1996 |
| JP | 10-329671 A | | 12/1998 |
| JP | 2000264182 A | * | 9/2000 |
| JP | 2001-071794 A | | 3/2001 |
| JP | 2006-232014 A | | 9/2006 |
| JP | 2009-071979 A | | 4/2009 |

OTHER PUBLICATIONS

Japanese Office Action issued on Oct. 1, 2012 (JP2011-023101) and partial English language translation of same.

* cited by examiner

*Primary Examiner* — Helal A Algahaim
*Assistant Examiner* — Paul Castro
(74) *Attorney, Agent, or Firm* — Gifford, Krass, Sprinkle, Anderson & Citkowski, P.C.

(57) ABSTRACT

A vehicle includes a braking force application device that executes braking force holding control which holds braking force irrespective of braking operation by a driver during a stop on a slope; and a control limiting device that limits execution of the braking force holding control when a shift position is set in a neutral position.

3 Claims, 3 Drawing Sheets

FIG. 3

|  | ASCENT IN FORWARD DIRECTION | FLAT ROAD | DESCENT IN FORWARD DIRECTION |
|---|---|---|---|
| POSITION FOR FORWARD TRAVEL (SP = D, B) | ENABLE BRAKING FORCE HOLDING CONTROL | DISABLE BRAKING FORCE HOLDING CONTROL | DISABLE BRAKING FORCE HOLDING CONTROL |
| POSITION FOR BACKWARD TRAVEL (SP = R) | DISABLE BRAKING FORCE HOLDING CONTROL | DISABLE BRAKING FORCE HOLDING CONTROL | ENABLE BRAKING FORCE HOLDING CONTROL |
| NEUTRAL POSITION (SP = N) | DISABLE BRAKING FORCE HOLDING CONTROL | DISABLE BRAKING FORCE HOLDING CONTROL | DISABLE BRAKING FORCE HOLDING CONTROL |

{ # VEHICLE

CROSS REFERENCE TO RELATED APPLICATIONS

This application claims priority to Japanese Patent Application No. 2011-023101 filed on Feb. 4, 2011, which is incorporated herein by reference in its entirety including the specification, drawings and abstract.

BACKGROUND OF THE INVENTION

1. Field of the Invention

The present invention relates to vehicles, and more particularly to a vehicle that includes a braking force application device which executes braking force holding control which holds braking force during a stop on a slope irrespective of a braking operation of a driver.

2. Description of Related Art

As this type of the vehicle, a system that controls a holding state of brake pressure of the vehicle based on a slope state of a road where the vehicle is situated has been proposed (see Japanese Patent Application Publication No. 10-329671 (JP-A-10-329671), for example). Such the vehicle performs brake hold control at a brief stop on an uphill slope and reduces the brake pressure when a clutch is partially engaged. On the other hand, when the vehicle makes a brief stop on a downhill slope, the brake hold control is released. By such the control, the vehicle is prevented from rolling backward at an uphill start, and also from starting suddenly at a downhill start.

However, the controlling is not considered for the vehicle described above when a shift position is in a neutral position during the brief stop on the uphill slope or the downhill slope. Thus, if the brake hold control is performed when the shift position is in the neutral position during the brief stop on an uphill slope, and if a driver shifts the shift position to the neutral position and tries to make a downhill driving with braking operations, the vehicle does not make a downhill movement due to the brake hold control, and unexpected movement of the vehicle for the driver provides a sense of discomfort to the driver.

SUMMARY OF THE INVENTION

The present invention provides a vehicle that prevents slip-down of the vehicle on the slope and, when the shift position is set in the neutral position, makes the vehicle move so that the driver can expect the movement and does not provide a sense of discomfort to the driver.

The vehicle according to an aspect of the present invention includes a braking force application device that executes braking force holding control which holds braking force irrespective of braking operation by a driver during a stop on a slope; and a control limiting device that limits execution of the braking force holding control when a shift position is set in a neutral position.

The vehicle according to the aspect described above executes the braking force holding control that holds the braking force with the braking force application device irrespective of the braking operation by the driver during the stop on the slope; however, the control limiting device limits the execution of the braking force holding control when the shift position is set in the neutral position. Therefore, the driver can purposefully make the vehicle slip down by the braking operation by the driver. As a result, if the braking operation is made by the driver with the shift position in the neutral position, the braking force holding control is executed, and therefore it can prevent providing a sense of discomfort to the driver due to non-slip-down of the vehicle. The limiting of the execution of the braking force holding control includes providing smaller braking force than that in the braking force holding control and disabling the execution of the braking force holding control, that is, releasing the braking force in the braking force holding control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a table that shows a list of shift positions, slopes, and modes of enabling/disabling of the braking force holding control.

DETAILED DESCRIPTION OF EMBODIMENTS

Figure 1:
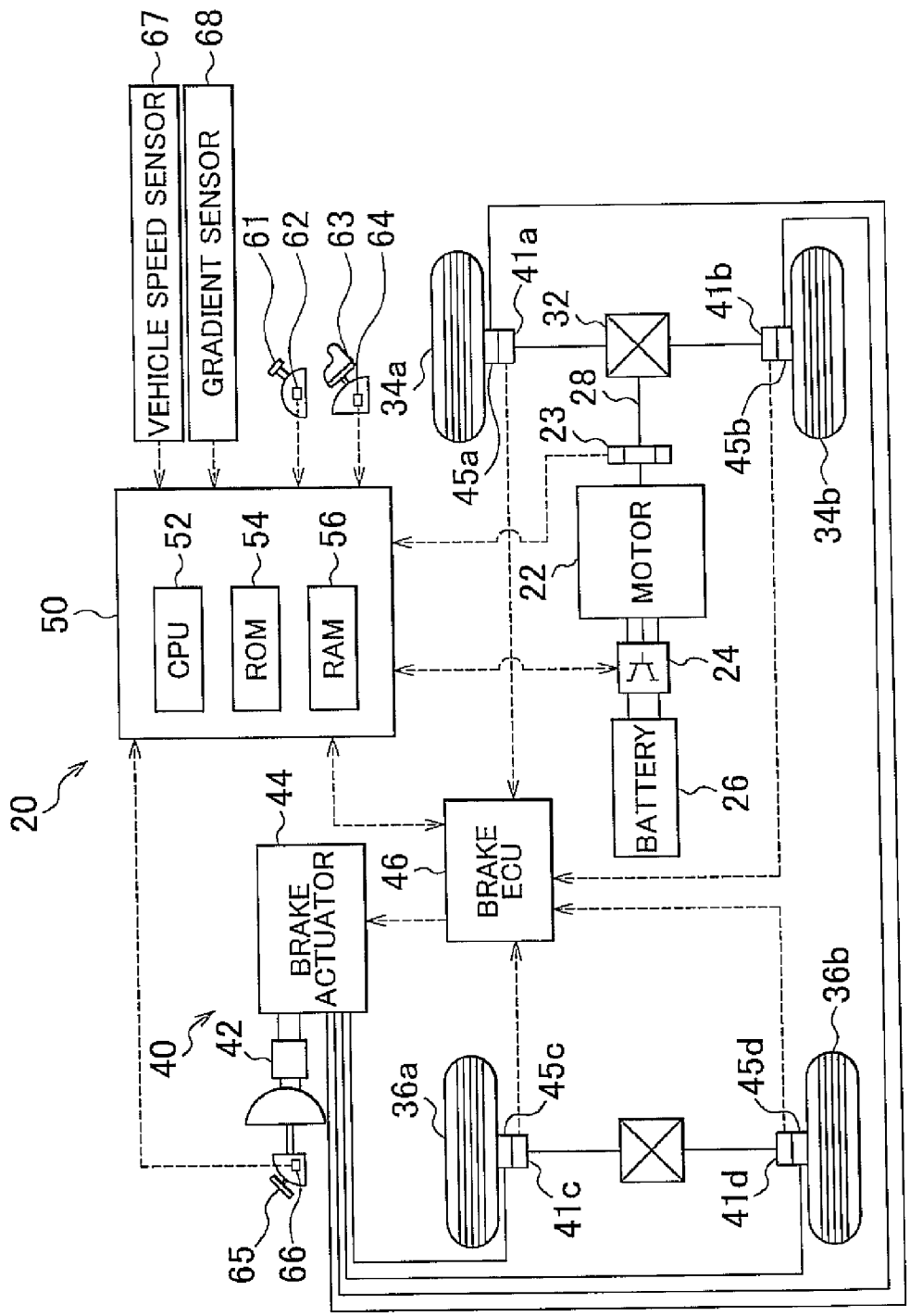
FIG. 1 is a block diagram that shows an outline of a structure of an electric vehicle as an embodiment of the present invention.

FIG. 1 is a block diagram that shows an outline of a structure of an electric vehicle 20 as an embodiment of the present invention. The electric vehicle 20 according to the present embodiment includes, as shown in the drawing, a motor 22 that can input and output drive power to a drive shaft 28 which is connected to driving wheels 34a and 34b through a differential gear 32, a rotational position detection sensor 23 that detects a rotational position of a rotor of the motor 22, a brake system 40 that applies mechanical braking force to the driving wheels 34a and 34b by hydraulic pressure from a brake actuator 44, and a main electronic control unit 50 that controls the entire vehicle.

The motor 22 is constructed as a well-known synchronous generator-motor and exchanges electric power with a battery 26 through an inverter 24. The rotational position detection sensor 23 is constructed as a sensor such as a resolver that detects a position of a magnetic pole of a permanent magnet which is disposed on the drive shaft 28 connected to the rotor of the motor.

The brake system 40 includes a brake master cylinder 42 that generates the hydraulic pressure (brake pressure) according to the movement of a brake pedal 65, a brake actuator 44 that feeds regulated hydraulic pressure to brake wheel cylinders 45a and 45b of the driving wheels 34a and 34b and brake wheel cylinders 45c and 45d of coupled driving wheels 36a and 36b, wheel speed sensors 41a and 41b that are mounted on the driving wheels 34a and 34b and wheel speed sensors 41c and 41d that are mounted on the coupled driving wheels 36a and 36b, and an electronic control unit for brakes (hereinafter, referred to as a brake ECU) 46 that controls the brake actuator 44. The brake actuator 44 is constructed to regulate the hydraulic pressure of the brake wheel cylinders 45a through 45d such that braking torque, according to a share of the braking force for each brake which is determined with the brake pressure and a rotation speed Nm of the motor 22 and exerted on the vehicle, acts on respective wheels 34a, 34b, 36a, and 36b, and to regulate the hydraulic pressure of the brake wheel cylinders 45a through 45d such that the braking torque acts on the respective wheels 34a, 34b, 36a, and 36b } independently of the brake pressure. The brake ECU 46 receives signals, such as of driving wheel speed Vfl and Vfr from the wheel speed sensors 41a and 41b, coupled driving wheel speed Vrl and Vrr from the wheel speed sensors 41c and 41d, and a steering angle from a steering angle sensor (not shown), and outputs a control signal to the brake actuator 44 to actuate an anti-lock brake system function (ABS) that prevents either of the driving wheels 34a and 34b or the coupled driving wheels 36a and 36b from locking up when the driver depresses the brake pedal 65, and to perform traction control (TRC) that prevents either the driving wheel 34a or 34b from a skid due to wheel slip when the driver depresses an accelerator pedal 63, attitude retaining control (VSC) that retains the attitude when the vehicle makes a turn during traveling, and braking force holding control that holds the brake pressure at a stop irrespective of release of the brake pedal 65 by the driver in order to prevent slip-down of the vehicle in a hill start and gradually releases the brake pressure when the motor 22 outputs the torque equal to or more than balancing torque required for the vehicle to stop on a slope road in response to the operation of the accelerator pedal 63 by the driver. Therefore, the brake system 40 functions as an ordinary brake system that applies the braking force in response to the depressing of the brake pedal 65 by the driver, as well as a skid prevention system or a braking force holding control system that prevents the skid when the driving wheels 34a and 34b slip and cause the skid. The brake ECU 46 performs communications with the main electronic control unit 50, controls the brake actuator 44 in accordance with a control signal from the main electronic control unit 50, and outputs the data related to a status of the brake actuator 44 or received data to the main electronic control unit 50 as needed.

The main electronic control unit 50 is constructed as a microprocessor with a CPU 52 as a main unit and includes a ROM 54 that stores a processing program, a RAM 56 that temporarily stores the data, input and output ports (not shown), and a communication port (not shown) in addition to the CPU 52. The main electronic control unit 50 receives through the input port a rotational position of the rotor of the motor 22 from the rotational position detection sensor 23, a phase current from a current sensor (not shown) that is installed in a power line from the inverter 24 to the motor 22, a shift position SP from a shift position sensor 62 that detects an operating position of a shift lever 61, accelerator pedal opening Acc from an accelerator pedal position sensor 64 that detects a depressing amount of the accelerator pedal 63, a brake pedal position BP from a brake pedal position sensor 66 that detects a depressing amount of the brake pedal 65, vehicle speed V from a vehicle speed sensor 67, and a gradient $\theta$ of the slope from a gradient sensor 68 that detects a gradient $\theta$ of the slope in order to determine whether the slope is an ascent or a descent. The main electronic control unit 50 outputs a switching control signal to the inverter 24 that drives the motor 22 through the output port. The main electronic control unit 50 also communicates with the brake ECU 46 through the communication port and exchanges various control signals and the data.

In the electric vehicle 20 according to the present embodiment, the positions of the shift lever 61 that are detected by the aforementioned shift position sensor 62 include a parking position (P-position), a neutral position (N-position), a drive position (D-position) for traveling in a forward direction, a brake position (B-position) for traveling in the forward direction and in which the braking force during accelerator pedal releasing is greater than that in the drive position, and a reverse position (R-position) for traveling in a backward direction.

Figure 2:
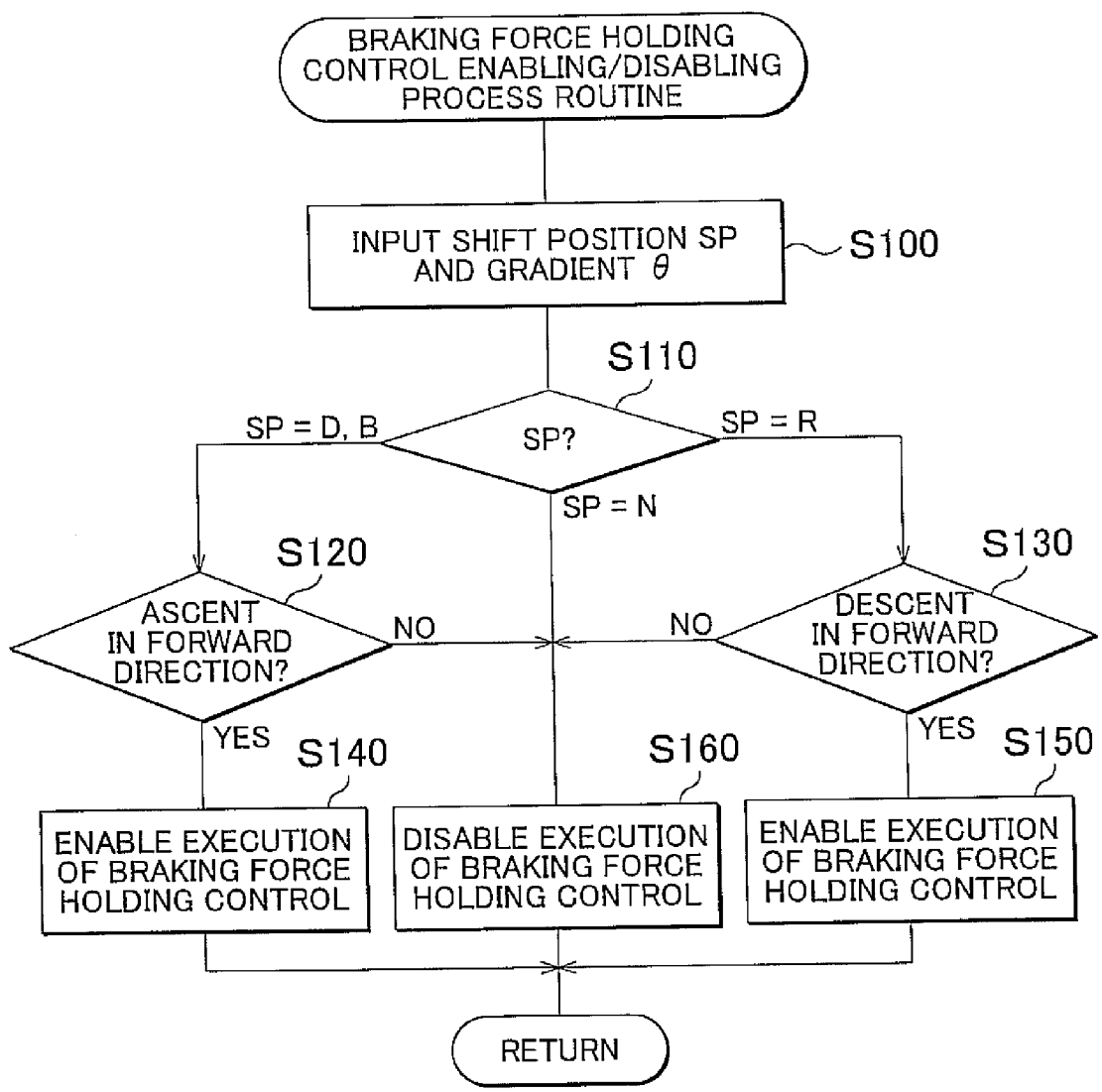
FIG. 2 is a flowchart that shows an example of a braking force holding control enabling/disabling process routine in which a CPU in a main electronic control unit executes.

Next, descriptions are made regarding the operation of the electric vehicle 20 according to the present embodiment that is constructed as described above, and more particularly, operation in the determination of enabling or disabling the braking force holding control based on the gradient $\theta$ and the shift position SP. FIG. 2 is a flowchart that shows an example of the braking force holding control enabling/disabling process routine in which the CPU 52 in the main electronic control unit 50 executes. This routine is executed when the vehicle makes a brief stop or when the shift lever 61 is operated during the stop.

When the braking force holding control enabling/disabling process routine of FIG. 2 is executed, the CPU 52 in the main electronic control unit 50 first receives the data that is required for determining the enabling or disabling of the braking force holding control such as the shift position SP from the shift position sensor 62 and the gradient $\theta$ from the gradient sensor 68 (step S100), and then checks the received shift position SP (step S110).

When the shift position SP is determined to be the position for traveling in a forward direction (such as the D-position or the B-position) in the step S110, it is determined whether the slope is the ascent or not with respect to the forward direction of the vehicle based on the gradient $\theta$ (step S120). When the slope is the ascent with respect to the forward direction of the vehicle, the CPU 52 determines the need of the braking force holding control in order to prevent the vehicle from slipping down to the backward direction at the start (at start in the forward direction), enables execution of the braking force holding control (step S140), and terminates this routine. On the other hand, when the slope is not the ascent with respect to the forward direction of the vehicle, that is, when the road is flat or the slope is the descent with respect to the forward direction of the vehicle, the CPU 52 disables the execution of the braking force holding control (step S160) in order to allow the vehicle to move in the forward direction when the brake pressure is released, and terminates this routine. In other words, when the shift position SP is the position for traveling in the forward direction, the execution of the braking force holding control is allowed only on the ascent in the forward direction, and for the rest, the execution of the braking force holding control is prohibited. Accordingly, it can prevent the vehicle from slipping down at start when the shift position SP is set in the position for traveling in the forward direction on the ascent in the forward direction, and the vehicle can move in the forward direction with just the release of the depressed brake pedal 65 at start when the shift position SP is set in the position for traveling in the forward direction on a flat road or the descent in the forward direction.

When the shift position SP is determined to be the position for traveling in a backward direction (R-position) in the step S110, it is determined whether the slope is the descent or not with respect to the forward direction of the vehicle based on the gradient $\theta$ (step S130). When the slope is the descent with respect to the forward direction of the vehicle, the CPU 52 determines the need of the braking force holding control in order to prevent the vehicle from slipping down to the forward direction at the start (at start in the backward direction), enables execution of the braking force holding control (step S150), and terminates this routine. On the other hand, when the slope is not the descent with respect to the forward direction of the vehicle, that is, when the road is flat or the slope is the ascent with respect to the forward direction of the vehicle, the CPU 52 disables the execution of the braking force holding control (step S160) in order to allow the vehicle to move in the backward direction when the brake pressure is released, and terminates this routine. In other words, when the shift position SP is the position for traveling in the backward direction, the execution of the braking force holding control is allowed only on the descent in the forward direction, and for the rest, the execution of the braking force holding control is prohibited. Accordingly, it can prevent the vehicle from slipping down at start when the shift position SP is set in the position for traveling in the backward direction on the descent in the forward direction, and the vehicle can move in the backward direction with just the release of the depressed brake pedal 65 at start when the shift position SP is set in the position for traveling in the backward direction on a flat road or the ascent in the forward direction.

When the shift position SP is determined to be in the neutral position (N-position) in the step S110, the CPU 52 disables the execution of the braking force holding control irrespective of the gradient θ (step S160), and terminates this routine. Accordingly, even if the driver releases the depressed brake pedal 65 on the flat road, the vehicle maintains a stopping state. Thus, when the driver releases the depressed brake pedal 65 on the ascent in the forward direction, the vehicle slips down in the backward direction, and when the driver releases the depressed brake pedal 65 on the descent in the forward direction, the vehicle slips down in the forward direction. Therefore, when the slope is the ascent or the decent in the forward direction, the driver can move the vehicle to the direction of the slope with just operation of the brake pedal 65 along with the gradient θ.

FIG. 3 is a table that shows a list of shift positions SP, gradients θ, and modes of enabling/disabling of the braking force holding control at the time of execution of the braking force holding control enabling/disabling process routine. As shown in the table, when the shift position SP is the position for traveling in the forward direction (such as the D-position or the B-position), the execution of the braking force holding control is enabled only on the ascent in the forward direction, and for the rest, the execution of the braking force holding control is disabled. In addition, when the shift position SP is the position for traveling in the backward direction (R-position), the execution of the braking force holding control is enabled only on the descent in the forward direction, and for the rest, the execution of the braking force holding control is disabled. Furthermore, when the shift position SP is in the neutral position (N-position), the execution of the braking force holding control is disabled irrespective of the gradient.

According to the electric vehicle 20 of the present embodiment as described above, if the shift position SP is determined to be in the neutral position (N-position) when the shift lever 61 is operated at the stop or during the stop, the execution of the braking force holding control is disabled irrespective of the gradient θ, and therefore, the vehicle maintains the stopping state even if the driver releases the depressed brake pedal 65 on the flat road, the driver can make the vehicle slip down in the backward direction at desired speed with operating the depressed brake pedal 65 on the ascent in the forward direction, and the driver can also make the vehicle slip down in the forward direction at the desired speed with operating the depressed brake pedal 65 on the descent in the forward direction. As a result, if the brake pedal 65 is operated with the shift position SP in the neutral position (N-position), the execution of braking force holding control is disabled, and therefore it can prevent providing a sense of discomfort to the driver due to non-slip-down of the vehicle. From the beginning, when the shift position SP is determined to be the position for traveling in the forward direction (such as the D-position or the B-position) on the ascent in the forward direction, the execution of the braking force holding control is enabled, and therefore it can prevent the vehicle from slipping down in the backward direction at the start. In addition, when the shift position SP is determined to be in the position for traveling in the backward direction (R-position) on the descent in the forward direction, the execution of the braking force holding control is enabled, and therefore it can prevent the vehicle from slipping down in the forward direction at the start.

The electric vehicle 20 according to the present embodiment is constructed such that the execution of the braking force holding control is disabled irrespective of the gradient θ if the shift position SP is determined to be in the neutral position (N-position) when the shift lever 61 is operated at the stop or during the stop. However, the vehicle may slip down on the ascent or the descent in the forward direction to some extent in response to the operation of the brake pedal 65, and the braking force holding control may be limited such that the execution of the braking force holding control is enabled within the range where the braking force is maintained to the extent that the vehicle slips down at predetermined low speed (for example, 2 km/h or 3 km/h) on the ascent or the descent in the forward direction.

The electric vehicle 20 according to the present embodiment is constructed such that the execution of the braking force holding control is disabled if the shift position SP is determined to be the position for traveling in the forward direction (such as the D-position or the B-position) on the descent in the forward direction when the shift lever 61 is operated at the stop or during the stop. However, the vehicle may slip down in the forward direction to some extent in response to the operation of the brake pedal 65, and the braking force holding control may be limited such that the execution of the braking force holding control is enabled within the range where the braking force is maintained to the extent that the vehicle slips down in the forward direction at predetermined low speed (for example, 2 km/h or 3 km/h). In addition, the electric vehicle 20 according to the present embodiment is constructed such that the execution of the braking force holding control is disabled if the shift position SP is determined to be the position for traveling in the backward direction (such as the R-position or the B-position) on the ascent in the forward direction when the shift lever 61 is operated at the stop or during the stop. However, the vehicle may slip down in the backward direction to some extent in response to the operation of the brake pedal 65, and the braking force holding control may be limited such that the execution of the braking force holding control is enabled within the range where the braking force is maintained to the extent that the vehicle slips down in the backward direction at predetermined low speed (for example, 2 km/h or 3 km/h).

The electric vehicle 20 according to the present embodiment is not described how it is operated if the shift position SP is in a parking position (P-position) when the shift lever 61 is operated at the stop or during the stop. However, when the shift position SP is in the parking position (P-position), the execution of the braking force holding control is disabled irrespective of the gradient θ, as described for the neutral position (N-position).

The electric vehicle 20 according to the present embodiment uses, as the braking force holding control, the control that holds the brake pressure at the stop irrespective of the release of the brake pedal 65 by the driver in order to prevent slip-down of the vehicle in a hill start and gradually releases the brake pressure when the motor 22 outputs the torque equal to or more than the balancing torque required for the vehicle to stop on the slope road in response to the operation of the accelerator pedal 63 by the driver. However, the control may be any control as long as it is the control for preventing the slip-down of the vehicle in the hill start.

The electric vehicle 20 according to the present embodiment determines whether the slope is the ascent or not, or the descent or not, with respect to the forward direction based on the gradient θ from the gradient sensor 68. However, the present invention may determine whether the slope is the ascent or not, or the descent or not, with respect to the forward direction according to the relation between the accelerator pedal opening and the vehicle speed until the stop, as disclosed in a document that is described in the related art section (JP-A-10-329671).

In this embodiment, a braking force holding control enabling/disabling process, in which the braking force holding control is enabled or disabled based on the shift position SP and the gradient θ when the shift lever 61 is operated at the stop or during the stop, is applied to the electric vehicle 20. However, the braking force holding control enabling/disabling process may be applied to any types of vehicles that can executes the braking force holding control such as an electric vehicle equipped with two or more motors, various hybrid vehicles including a series hybrid vehicle, a parallel hybrid vehicle, and a power assist hybrid vehicle (mild parallel hybrid vehicle), and various vehicles that are not equipped with a drive motor.

In this embodiment, the brake system 40 corresponds to the "braking force application device" of the present invention, and the main electronic control unit 50 that executes the braking force holding control enabling/disabling process routine as shown in FIG. 2 corresponds to the "control limiting device" of the present invention.

While the present invention has been described with reference to embodiments thereof, it should be understood that the invention is not limited to the embodiments described above and may be modified without departing from the scope of the invention.

The present invention is applicable to vehicle manufacturing industries and the like.

The invention claimed is:

1. A vehicle comprising:
   a braking force application device that executes braking force holding control which holds braking force irrespective of braking operation by a driver during a stop on a slope; and
   a control limiting device that limits execution of the braking force holding control when a shift position is set in a neutral position wherein the control limiting device disables the execution of the braking force holding control when the shift position is set in a position in which a traveling direction of a vehicle is designated in a forward direction and when the slope is the descent with respect to the forward direction of the vehicle,
   wherein the control limiting device disables the execution of the braking force holding control irrespective of the gradient of the slope and when the shift position is determined to be in the neutral position.

2. The vehicle according to claim 1, wherein:
   the control limiting device enables the execution of the braking force holding control when the shift position is set in a position in which the traveling direction of the vehicle is designated in an uphill direction, and disables the execution of the braking force holding control when a road is flat or when the shift position is set in a position in which the traveling direction of the vehicle is designated in the downhill direction.

3. A vehicle comprising:
   a braking force application device that executes braking force holding control which holds braking force irrespective of braking operation by a driver during a stop on a slope; and
   a control limiting device that limits execution of the braking force holding control when a shift position is set in a neutral position wherein the control limiting device disables the execution of the braking force holding control when the shift position is set in a position in which a traveling direction of a vehicle is designated in a backward direction and when the slope is the ascent with respect to the forward direction of the vehicle,
   wherein the control limiting device disables the execution of the braking force holding control irrespective of the gradient of the slope and when the shift position is determined to be in the neutral position.

* * * * *